March 24, 1925.

P. K. DEVERS

SEALED-IN CONDUCTOR

Filed Aug. 3, 1921

1,531,265

Inventor,
Philip K. Devers,
by Albert G. Davis
His Attorney.

Patented Mar. 24, 1925.

1,531,265

UNITED STATES PATENT OFFICE.

PHILIP K. DEVERS, OF LYNN, MASSACHUSETTS, ASSIGNOR TO GENERAL ELECTRIC COMPANY, A CORPORATION OF NEW YORK.

SEALED-IN CONDUCTOR.

Application filed August 3, 1921. Serial No. 489,630.

*To all whom it may concern:*

Be it known that I, PHILIP K. DEVERS, a citizen of the United States, residing at Lynn, in the county of Essex, State of Massachusetts, have invented certain new and useful Improvements in Sealed-In Conductors, of which the following is a specification.

The present invention comprises a new electric current-conducting seal and the method of making the same. Altho a seal embodying my invention may be used for a variety of purposes it is the especial object of my invention to provide a seal suitable for use with vessels of fused silica or quartz glass as it is commonly known.

The substantially zero coefficient of thermal expansion of silica precludes the sealing-in of the conductors by methods commonly used for electric apparatus consisting of glass. Moreover, the high melting point of silica requires that a commercially usable seal for fused silica have a relatively simple geometric form. As far as I am aware, commercially useful seals in vessels of fused silica prior to my invention have been made by interposing glasses of varying composition between the fused silica and the wire or other conducting body of the seal.

I have discovered that it is possible to maintain quartz glass, especially when in the form of a thin-walled tube, under compression by a body of metal having a suitable coefficient of expansion so that a tight joint will be maintained between the quartz glass and a sealed-in conductor. As will be pointed out with particularity in the appended claims, a seal embodying my invention is made by applying an envelope of molten metal about a tube of quartz glass while a conductor is present within the tube, and allowing this envelope to cool and contract or expand upon the wall of silica thereby gripping the same.

Figure 3:
Figure 4:
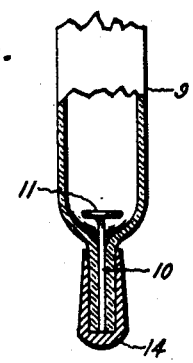
Figure 5:
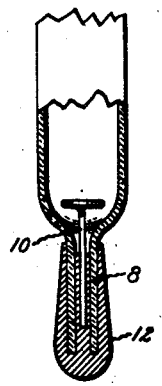
Figure 6:
Figure 7:
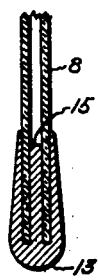

Figs. 1, 2, 3, and 4 show in longitudinal section various stages in the production of my improved seal, and Figs. 5, 6 and 7 are longitudinal sections of modifications.

Figure 1:
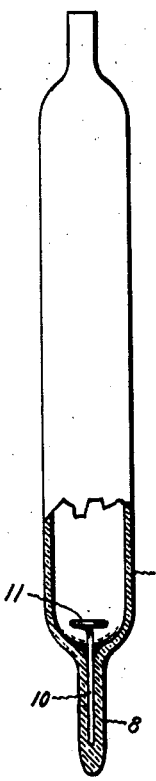
Figure 2:
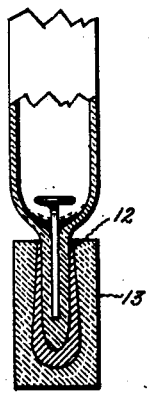

Referring to Fig. 1 the first step in the production of seals may be carried out by producing an extension 8 in the container 9 in the form of a relatively thin-walled tube, and inserting a wire or other conductor 10, which may be connected to electrode 11, for example, and which may consist of tungsten, iron, nickel, or other suitable material. The tube 8 preferably has a greater length than its wall diameter, and the container 9 may be evacuated or not, as desired. The conductor 10 may be connected to an electrode 11.

The parts thus assembled next are dipped into a body of molten metal 12 contained within a crucible 13. The body of metal 12 may consist of iron, a suitable ferrous alloy, nickel or other suitable metal having a materially greater thermal coefficient of expansion than silica. The metal 12 is permitted to cool and solidify about the quartz wall 8 thereby shrinking and gripping the silica. The container 13 then may be removed and the end of the silica tube with the surrounding metal may be cut away as indicated in Fig. 3, exposing the end of the wire 10. During this operation gas will not leak between the silica wall and the wire 10, but to completely protect the seal it is desirable to provide a cap 14 of metal as indicated in Fig. 4. The cap 14 may be constituted of the same metal as the shell 12 but almost any metal can be used. It may be applied by fusing the end of a wire and directing the drops of fused metal against the end of the seal. Preferably the shell 12 is thinner walled near the junction of the extension 8 with the container 9 than at the more remote portion, as indicated in the drawing. In some cases it is desirable to provide an enlargement or bead 15 in the tube 8 adjacent to its junction with the main body of the container 9 in order to minimize danger of cracking the tube 8 at this region and to provide additional means for the metal to grip the quartz.

It is not necessary that the conductor 10 make a tight fit within the tube 8. As shown in Fig. 5, the conductor 10 may fit loosely within the tube so that molten metal will be drawn into the space between the conductor and the surrounding tube 8, the end of which is open as indicated. In that case a metal of lesser expansion coefficient than quartz may be used as upon solidification as the inner core 15 will place the quartz tube 8 under compression.

The space between the conductor 10 and the inner wall of the tube 8 is shown somewhat exaggerated in order to render the drawing clear.

In some cases the conductor 10 within the tube may be entirely omitted. As shown in Fig. 7 a portion of the body of molten metal being drawn by vacuum or any suitable way into the tube 8. Contact from internal conducting bodies such as electrodes or the like to the filling of metal 15 within the tube 8 may be made in any desired way.

This modification of my seal will be particularly advantageous when contact is to be made to a body of mercury or other conducting material.

What I claim as new and desire to secure by Letters Patent of the United States is:

1. A current conducting seal comprising the combination of a tubular member consisting of fused silica, a body of metal having a different coefficient of thermal expansion than silica shrunk about said tubular member so that said member is maintained under compression.

2. A current conducting seal comprising the combination of a thin-walled tubular member consisting of fused silica, a wire passing thru the bore of said tube and a body of metal cast about said silica tube and making contact with said wire.

3. A current-conducting seal comprising the combination of a container, a tubular member consisting of fused silica, having greater length than diameter joined to said container at one end, a conductor passing thru the bore of said tube, a shell of metal having greater coefficient of expansion than silica shrunk upon said tube and a metal cap upon the free end of said tube joined both to the conductor within the tube and the shell surrounding the tube.

4. A seal comprising the combination of a tube consisting of fused silica, and a body of metal having a greater coefficient of expansion than silica cast upon the exterior of said tube over a length materially greater than the diameter of said tube and enclosing the mouth of said tube.

5. The method of making a current conducting seal for a container of quartz glass which consists in producing a tubular extension upon said container having a length in excess of the diameter thereof, inserting a conductor into said tube, surrounding said tube by a layer of molten metal having greater coefficient of expansion than quartz, and permitting said metal to solidify.

6. The method of making a current conducting seal in a quartz container which consists in forming a tubular extension in the wall of said container, inserting a conductor into the bore of said tubular extension, surrounding said tubular extension by an envelope of molten metal having an appreciable thermal coefficient of expansion and permitting said metal to solidify and shrink upon said extension.

7. A composite body of silica and a metal comprising a mass of silica and a mass of metal surrounding and gripping the silica, said metal being shrunk upon the silica by solidifying in place from a fused state.

8. A gas-tight composite body of silica and a metal comprising a mass of silica, a core of metal therein having a higher temperature coefficient of expansion than silica, and a mass of metal surrounding said silica mass, said metal also having a higher coefficient of expansion than silica.

9. A container consisting of silica glass having a tubular extension, an electrode within said container, a conductor connected to said electrode and passing through the bore of said extension, a body of metal surrounding said extension and entering into the bore thereof.

10. The combination of a container of silica glass having a tubular extension, a body of metal enclosing the extremity of said extension and entering the bore thereof, said metal being solidified in place from a fused state.

11. The combination of a container of silica glass having a thin-walled tubular extension, conductors respectively filling and surrounding said extension, and placing the wall of said tubular extension under compression.

12. A container consisting of silica glass and having a tubular extension, a conductor filling the bore of said extension, and a body of metal surrounding said extension and being shrunk thereon by cooling from a fused state, the thickness of said exterior metal body being less near the junction of said extension and the container.

13. The process of providing a sealed-in conductor in a vessel of silica glass which consists in producing a tubular extension of the wall of said vessel at the region said conductor is desired, surrounding said extension and filling the bore thereof with molten metal, and allowing said metal to cool and shrink upon said extension.

14. The process of sealing a leading-in conductor into containers of quartz glass which consists in imbedding said conductor in a tubular extension of said container and shrinking upon said extension a metal from the fused state.

15. The method of sealing a conductor into a quartz tube which consists in causing molten metal to solidify in contact with both the inner and the outer surfaces of said tube, said metal being chosen to have a coefficient of expansion sufficiently high to cause the resulting core and shell to hold said silica tube under compression.

In witness whereof I have hereunto set my hand this 1st day of August, 1921.

PHILIP K. DEVERS.